E. R. BENTON.
Mill Spindle.
No. 1,533. Patented March 31, 1840.
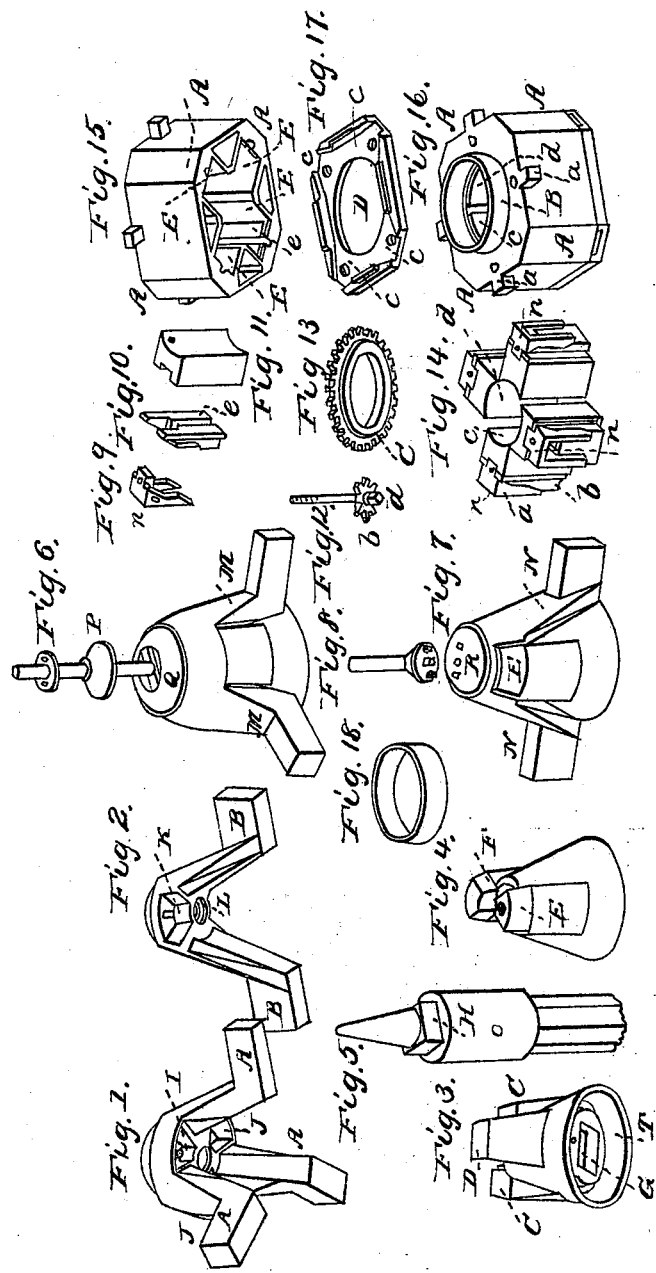

UNITED STATES PATENT OFFICE.

EZRA R. BENTON, OF OHIO, OHIO.

MODE OF CONSTRUCTING BALES AND DRIVERS FOR GRIST-MILLS.

Specification of Letters Patent No. 1,533, dated March 31, 1840.

*To all whom it may concern:*

Be it known that I, EZRA R. BENTON, of Ohio city, in the county of Cuyahoga and State of Ohio, have invented a new and improved Mode of Constructing Bales and Drivers for Mills and Known by the Name of "E. R. Benton's Coupled Bale and Driver;" and I do hereby declare that the following is a full and exact description.

The nature of my invention consists in situating the coupling of the bale and driver at an equal distance from the face of the stones with the point on which the stone is suspended, or so near this point as to obviate the difficulties attending the old kind when the spindle loses its perpendicular position to the face of the stone, the principal of which difficulties are an unequal bearing in the drivers, producing an alternate lateral strain on the point of the cockhead of the spindle, (often breaking it, or loosening the bale) causing an injurious tremor or jar in the stones, which is unavoidably the case in a greater or less degree.

To enable others skilled in the art to make and use my invention, I will proceed to describe their construction and operation.

My bale and driver may be made with any practicable number of prongs or bearings, but considered best with two or three.

Figures 1 and 3 in the accompanying drawings are representations of my three pronged bale and driver. A, A, A, Fig. 1, are the prongs of the bale. J, I, J are the depressions between them for the reception of the prongs or bearings of the driver C, D, C, Fig. 3. This connection constitutes their coupling. The hemispherical depression for the reception of the point or cockhead of the spindle, on which the stone is suspended and balanced, is situated in the center of the cap of the bale, as seen at I, Fig. 1.

Figs. 2 and 4 represent my two pronged bale and driver.

B, B, are the prongs of the bale, and K, L, are depressions between them for the reception of the prongs or bearings E, F, of the driver. This connection also constitutes their couplings. These in other respects are constructed in the same manner as Figs. 1 and 3.

I use the common spindle, Fig. 5, with a cockhead of any of the known forms, but in order to obviate the necessity of fitting the mortise G of the driver so accurately to the square H of the spindle that the bearings of the coupling shall perfectly meet each other, I make the sides of the square H rounding in a longitudinal direction, that the driver may bend on the spindle till the corresponding bearings of the coupling meet, when it will be as firmly held as though it was immovably fitted to the spindle. The cockhead of the spindle must be of sufficient height to raise the bale, so as not to ride or bear upon the driver, and that part of the hole through the driver above the mortise G, must be sufficiently large not to touch or bear against the spindle.

Fig. 6 is a representation of Figs. 1 and 3, coupled together as they work.

Fig. 7 represents Figs. 2 and 4, showing with Fig. 8, the mode of constructing and connecting the damsel to the bale, by the three prominences or projections at its base, entering the three holes at R, Fig. 7.

The base of the prongs of the bales at M, M, Fig. 6, and N, N, Fig. 7, should not diverge so far from the center as to meet the eye of the stone, save an inch or more, leaving room for the introduction of a rod to prevent the eye of the stone from clogging when grinding middlings or damp grain.

My bales require a true, central, firmly fixed adjustment to the eye of the stone, not requiring the use of the spindle as do the old kinds.

What I claim as my invention, and desire to secure by Letters Patent, is—

1. The constructing the bale and driver with corresponding prongs and depressions as shown at C, D, C, Fig. 3, and J, I, J, Fig. 1, constituting a three bearing coupling, and E, F, Fig. 4, and K, L, Fig. 2, constituting a two-bearing coupling, connectively shown at Figs. 6 and 7; said couplings being on a level or nearly so, with the hemispherical depression in the center of the bale, thus coupling the bale and driver together, at or nearly the same distance from the face of the stone with the point of the spindle on which the stone is suspended and balanced, in the manner herein set forth.

2. I also claim the giving the rounding or head form to the sides of the square H, of the spindle, for the purpose of enabling it to move freely within the mortise G of the driver, notwithstanding any bending of the driver upon the spindle.

EZRA R. BENTON.

Witnesses:
WILLIAM FULLER,
C. L. RUSSELL.